(12) United States Patent
Lu

(10) Patent No.: US 11,217,868 B2
(45) Date of Patent: Jan. 4, 2022

(54) LIQUID CRYSTAL PHASE SHIFTER AND ELECTRONIC DEVICE

(71) Applicant: BOE TECHNOLOGY GROUP CO., LTD., Beijing (CN)

(72) Inventor: Yongchun Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 251 days.

(21) Appl. No.: 16/607,290

(22) PCT Filed: Mar. 1, 2019

(86) PCT No.: PCT/CN2019/076747
§ 371 (c)(1),
(2) Date: Oct. 22, 2019

(87) PCT Pub. No.: WO2019/233140
PCT Pub. Date: Dec. 12, 2019

(65) Prior Publication Data
US 2021/0336312 A1   Oct. 28, 2021

(30) Foreign Application Priority Data

Jun. 8, 2018   (CN) .......................... 201810586917.2

(51) Int. Cl.
*H01P 1/18*   (2006.01)
*H01Q 3/34*   (2006.01)

(52) U.S. Cl.
CPC ................ *H01P 1/18* (2013.01); *H01P 1/184* (2013.01); *H01Q 3/34* (2013.01)

(58) Field of Classification Search
CPC .. H01P 1/18; H01P 1/181; H01P 1/182; H01P 1/183; H01P 1/184; H01P 1/19; H01P 1/195; H01P 9/00; H01Q 3/34; H01Q 3/32; H01Q 3/30; H01Q 3/28; H01Q 3/26; H01Q 3/2694; H01Q 3/2682; H01Q 3/36
See application file for complete search history.

(56) References Cited

U.S. PATENT DOCUMENTS

2019/0319325 A1*   10/2019   Zhang ..................... H01Q 3/36

\* cited by examiner

*Primary Examiner* — Stephen E. Jones
(74) *Attorney, Agent, or Firm* — Collard & Roe, P.C.

(57) ABSTRACT

A liquid crystal phase shifter and an electronic device. The liquid crystal phase shifter includes a first substrate and a second substrate arranged opposite to each other, a liquid crystal layer, a first electrode and a second electrode. The liquid crystal layer is between the first substrate and the second substrate. The first electrode is on the first substrate. The second electrode is on the second substrate. The second electrode includes a connection portion and a plurality of concentric annular structures, at least one of the concentric annular structures includes a plurality of protruded portions, at least another of the concentric annular structures includes a plurality of recessed portions, and the connection portion is electrically connected to each of the concentric annular structures.

20 Claims, 4 Drawing Sheets

LIQUID CRYSTAL PHASE SHIFTER AND ELECTRONIC DEVICE

CROSS REFERENCE TO RELATED APPLICATIONS

This application is the National Stage of PCT/CN2019/076747 filed on Mar. 1, 2019, which claims priority under 35 U.S.C. § 119 of Chinese Application No. 201810586917.2 filed on Jun. 8, 2018, the disclosure of which is incorporated by reference.

TECHNICAL FIELD

The embodiments of the present disclosure relate to a liquid crystal phase shifter and an electronic device.

BACKGROUND

A phase shifter is a device capable of adjusting the phase of electromagnetic waves, and has a wide range of applications in radar systems, mobile communication systems, and microwave measurement, etc. Upon a phase shifter adjusting the circuit parameters, the phase of the signal can be continuously or discontinuously changed without changing the amplitude of the signal, that is, the signal can pass without distortion, but only the phase changes. Early phase shifters include mechanical analog phase shifters. With the development of technology, electronic phase shifters emerged as the times require, and gradually developed into miniaturization and high integration.

In recent years, a liquid crystal phase shifter has been extensively and intensively studied as a new type of phase shifter. The liquid crystal phase shifter uses liquid crystal material as a control medium to control the output phase by changing the transmission constant of the electromagnetic wave. The liquid crystal phase shifter has the advantages of large phase shift amount, low working voltage and small volume, and has broad application prospects.

SUMMARY

At least one embodiment of the present disclosure discloses provides a liquid crystal phase shifter, including: a first substrate and a second substrate arranged opposite to each other; a liquid crystal layer, between the first substrate and the second substrate; a first electrode, on the first substrate; a second electrode, on the second substrate, wherein the second electrode includes a connection portion and a plurality of concentric annular structures, at least one of the plurality of concentric annular structures includes a plurality of protruded portions, at least another of the plurality of concentric annular structures includes a plurality of recessed portions, and the connection portion is electrically connected to each of the plurality of concentric annular structures.

For example, in the liquid crystal phase shifter provided by an embodiment of the present disclosure, the plurality of concentric annular structures include a first annular structure, the first annular structure includes a plurality of protruded portions, and the plurality of protruded portions are protruded in a radial direction of the first annular structure.

For example, in the liquid crystal phase shifter provided by an embodiment of the present disclosure, the plurality of protruded portions are equally spaced along a circumference of the first annular structure.

For example, in the liquid crystal phase shifter provided by an embodiment of the present disclosure, a shape of each of the plurality of protruded portions is a rectangle, and a width of the rectangle in a tangential direction of the first annular structure is less than about 4 times a width of the first annular structure in a radial direction.

For example, in the liquid crystal phase shifter provided by an embodiment of the present disclosure, a number of the plurality of protruded portions is four.

For example, in the liquid crystal phase shifter provided by an embodiment of the present disclosure, the plurality of concentric annular structures further include a second annular structure, the second annular structure includes a plurality of recessed portions, the recessed portions are recessed in a radial direction of the second annular structure.

For example, in the liquid crystal phase shifter provided by an embodiment of the present disclosure, the plurality of recessed portions are equally spaced along a circumference of the second annular structure.

For example, in the liquid crystal phase shifter provided by an embodiment of the present disclosure, a shape of each of the plurality of recessed portion is a rectangle, and a width of the rectangle in a tangential direction of the second annular structure is less than about 1.5 times a width of the second annular structure in a radial direction.

For example, in the liquid crystal phase shifter provided by an embodiment of the present disclosure, a number of the plurality of recessed portions is four.

For example, in the liquid crystal phase shifter provided by an embodiment of the present disclosure, the plurality of recessed portions and the plurality of protruded portions are mutually staggered in a circumference direction, and each of the plurality of recessed portions is equidistant from two adjacent ones of the plurality of protruded portions.

For example, in the liquid crystal phase shifter provided by an embodiment of the present disclosure, the plurality of protruded portions are protruded in a direction close to the second annular structure, and the recessed portions are recessed in a direction away from the first annular structure.

For example, in the liquid crystal phase shifter provided by an embodiment of the present disclosure, the plurality of concentric annular structures further include a third annular structure, the third annular structure being located on an inner side of the first annular structure and the second annular structure.

For example, in the liquid crystal phase shifter provided by an embodiment of the present disclosure, a circumference of the third annular structure is less than about 1.5 times a wavelength of a target electromagnetic wave propagating in a medium layer, and is greater than about 0.2 times the wavelength of the target electromagnetic wave propagating in the medium layer, the medium layer includes the first substrate, the second substrate and the liquid crystal layer.

For example, in the liquid crystal phase shifter provided by an embodiment of the present disclosure, a circumference of an outer one of the plurality of concentric annular structures is less than about 3 times the wavelength of the target electromagnetic wave propagating in the medium layer, and is greater than the wavelength of the target electromagnetic wave propagating in the medium layer, the medium layer includes the first substrate, the second substrate and the liquid crystal layer.

For example, in the liquid crystal phase shifter provided by an embodiment of the present disclosure, the connection portion includes a plurality of electric leads, the plurality of electric leads extend in a radial direction of the plurality of concentric annular structures and cross each other, and the plurality of electric leads are electrically connected to each of the plurality of concentric annular structures.

For example, in the liquid crystal phase shifter provided by an embodiment of the present disclosure, both ends of each of the electric leads are connected to corresponding ones of the plurality of protruded portions.

For example, in the liquid crystal phase shifter provided by an embodiment of the present disclosure, the plurality of electric leads include two electric leads perpendicular to each other.

For example, in the liquid crystal phase shifter provided by an embodiment of the present disclosure, the first electrode is a metal layer, and a projection of the second electrode on the first substrate in a direction perpendicular to the first substrate is within the metal layer.

For example, the liquid crystal phase shifter provided by an embodiment of the present disclosure includes a first alignment layer and a second alignment layer, wherein the first alignment layer and the second alignment layer are respectively disposed on surfaces of the first substrate and the second substrate opposite to each other.

For example, the liquid crystal phase shifter provided by an embodiment of the present disclosure includes a bias voltage source, wherein the first electrode and the second electrode are configured to connect the bias voltage source to provide a bias electric field to the liquid crystal layer.

For example, in the liquid crystal phase shifter provided by an embodiment of the present disclosure, the liquid crystal phase shifter is a reflective space feed phase shifter.

At least one embodiment of the present disclosure further provides an electronic device, including the liquid crystal phase shifter according to any embodiment of the present disclosure.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

Figure 1:
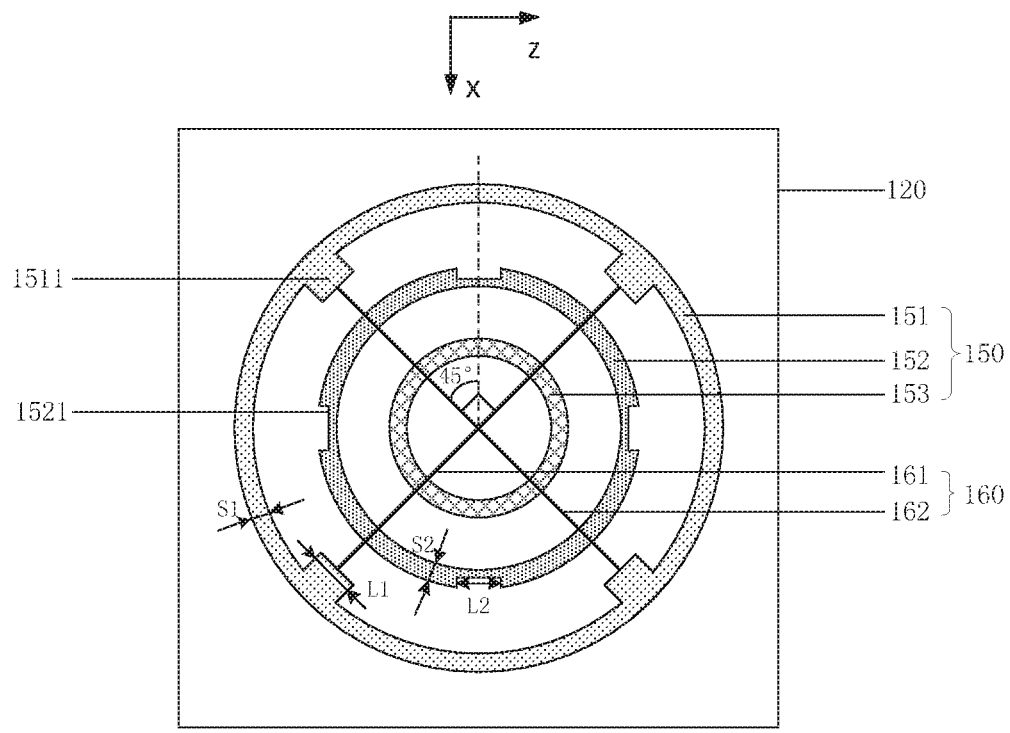
FIG. 1 is a schematic bottom view of a second substrate of a liquid crystal phase shifter according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first", "second", etc., which are used in the description and the claims of the present application for disclosure, are not intended to indicate any sequence, amount or importance, but distinguish various components. Also "a", "an", "the", etc., which are not intended to indicate any amount. The terms "comprise," "comprising", "include", "including", etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Upper", "lower", "left", "right", etc. are only used to indicate the relative positional relationship, and when the absolute position of the object to be described is changed, the relative positional relationship may also change accordingly.

The phase shifter can be divided into two types: space feed phase shifter and forced feed phase shifter according to different ways of signal input and output. The space feed phase shifter means that, electromagnetic waves are output from a signal source and then enters a phase shifter through space radiation, after passing through the phase shifter (in the form of transmission or reflection), they are output as space radiation and finally received by an electromagnetic wave receiver. The forced feed phase shifter means that, electromagnetic waves enter a phase shifter through a dedicated metal or medium microwave transmission structure (such as microstrip lines, coaxial lines, waveguides, etc.) from a signal source output port, after passing through the phase shifter, they are output to an electromagnetic wave receiver through a dedicated metal or medium microwave transmission structure.

Generally speaking, in the high frequency band and the terahertz band of the microwave frequency, in order to reduce the loss, a space feed phase shifter is generally used. In addition, for some specific application scenarios, such as electronically controlled scanning antennas based on adjustable reflective surfaces or adjustable electric lenses, a space feed phase shifter is required for both low-frequency and high-frequency microwaves. Therefore, the space feed phase shifter is of great significance for the electronically controlled scanning antenna technology, especially for the electronically controlled scanning antenna technology of the high frequency band and the terahertz band of the microwave frequency.

The space feed phase shifter can be made of a liquid crystal material, and is classified into a transmission type (the electromagnetic wave penetrates the phase shifter) and a reflection type (the electromagnetic wave is returned after the phase shift of the phase shifter) according to different transmission paths of the electromagnetic waves. There are two main design methods for a space feed liquid crystal phase shifter. One is to directly dispose the liquid crystal material between two plate electrodes having good wave permeability, and change the dielectric constant and phase shift constant of the liquid crystal by a bias voltage, thereby changing the phase of the electromagnetic wave passing through the phase shifter. Such space feed liquid crystal phase shifters generally have the disadvantages of long response time and slow response speed. Another design method is to design a special metal electrode structure, by introducing electromagnetic resonance, so that the liquid crystal layer of the same thickness has a stronger phase shift ability, so as to solve the contradiction between the phase shift amount and the response speed. However, in order to achieve resonance, the polarization characteristics of the microwave and terahertz signals are usually destroyed. Especially when the incident microwave and the terahertz signals are circularly polarized waves, the current space feed liquid crystal phase shifter cannot work normally.

At least one embodiment of the present disclosure provides a liquid crystal phase shifter and an electronic device. By designing a liquid crystal composite resonant structure having bidirectional symmetry characteristics, circular polarization characteristics of incident electromagnetic waves can be maintained. The liquid crystal phase shifter supports a circularly polarized electromagnetic wave, has a large phase shift amount, a fast response speed, and has a simple structure, and is easy to process with high precision.

Hereinafter, embodiments of the present disclosure will be described in detail with reference to the accompanying drawings. It should be noted that the same reference numerals will be used in the different drawings to refer to the same elements that have been described.

At least one embodiment of the present disclosure provides a liquid crystal phase shifter. The liquid crystal phase shifter includes a first substrate and a second substrate arranged opposite to each other, a liquid crystal layer, a first electrode and a second electrode. The liquid crystal layer is between the first substrate and the second substrate. The first electrode is on the first substrate. The second electrode is on the second substrate. The second electrode includes a connection portion and a plurality of concentric annular structures, at least one of the plurality of concentric annular structures includes a plurality of protruded portions, at least another of the plurality of concentric annular structures includes a plurality of recessed portions, and the connection portion is electrically connected to each of the plurality of concentric annular structures.

Figure 2:
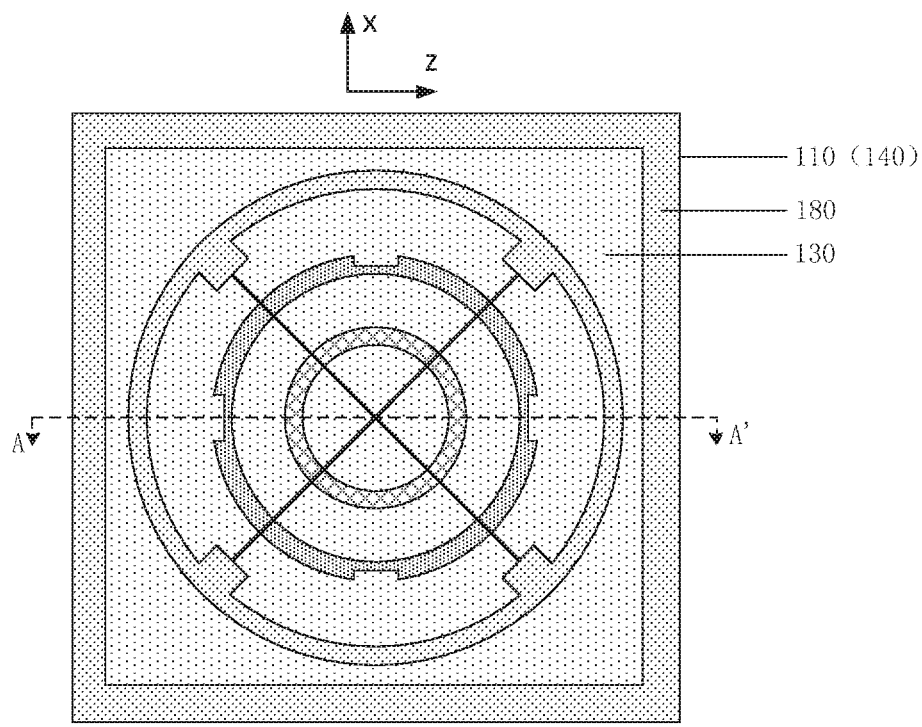
FIG. 2 is a schematic perspective view of the liquid crystal phase shifter illustrated in FIG. 1.
Figure 3:
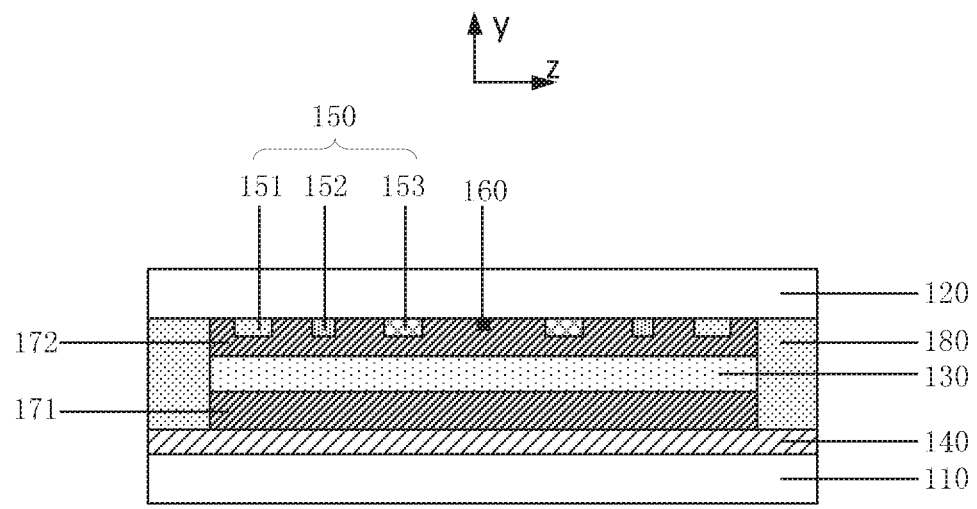
FIG. 3 is a schematic section view of the liquid crystal phase shifter illustrated in FIG. 2 along direction A-A'.

FIG. 1 is a schematic bottom view of a second substrate of a liquid crystal phase shifter according to an embodiment of the present disclosure. FIG. 2 is a schematic perspective view of the liquid crystal phase shifter illustrated in FIG. 1, and FIG. 3 is a schematic section view of the liquid crystal phase shifter illustrated in FIG. 2 along direction A-A'. Referring to FIG. 1 to FIG. 3, the liquid crystal phase shifter includes the first substrate 110, the second substrate 120, the liquid crystal layer 130, the first electrode 140 and the second electrode 150.

The first substrate 110 and the second substrate 120 are arranged opposite to each other, and function as support, protection, insulation, etc., and can further be used to avoid leakage of electromagnetic waves to reduce radiation loss of the liquid crystal phase shifter. For example, the first substrate 110 and the second substrate 120 can be printed circuit boards (PCBs), therefore, the liquid crystal phase shifter can be processed by a PCB process, which reduces production costs. For example, the printed circuit board can use a plastic substrate or a ceramic substrate, etc. For example, the first substrate 110 and the second substrate 120 can be Rogers high-frequency plates made of polytetrafluoroethylene. Of course, embodiments of the present disclosure are not limited thereto, and the first substrate 110 and the second substrate 120 may be of any suitable material.

The liquid crystal layer 130 is between the first substrate 110 and the second substrate 120. For example, the liquid crystal layer 130 uses a single liquid crystal material having a large anisotropy, such as a nematic liquid crystal or the like, or uses a mixed liquid crystal material (mixed crystal) as long as it can serve as a control medium, and embodiments of the present disclosure are not limited thereto. The thickness of the liquid crystal layer 130 (i.e., the cell thickness of the liquid crystal cell formed by the first substrate 110 and the second substrate 120) may be determined according to actual needs, for example, determined according to the response time and the amount of phase shift.

The first electrode 140 is on the first substrate 110. For example, the first electrode 140 is a metal layer, and at least partially covers the surface of the first substrate 110 close to the second substrate 120. For example, the first electrode 140 can be connected as a ground layer to a separately provided ground to facilitate application of a bias voltage to the liquid crystal layer 130. The first electrode 140 also acts as a reflection to reflect electromagnetic waves incident parallel to the y direction and return the electromagnetic waves to the original path.

In the embodiments of the present disclosure, three directions x, y and z illustrated in FIG. 1 to FIG. 3 are three directions perpendicular to each other in the Cartesian coordinate system, and the three directions may be any directions perpendicular to each other in the ground reference system, for example, the z direction is a direction perpendicular to the ground, however, the embodiments of the present disclosure are not limited thereto, and the coordinate system can be transformed as needed. For example, electromagnetic waves are incident into the liquid crystal phase shifter from a direction perpendicular to the first substrate 110 (i.e., parallel to the y direction), and the first electrode 140 reflects the electromagnetic waves and returns it in the original direction that is perpendicular to the first substrate 110. The first electrode 140 can be made of copper, aluminum, gold, silver or an alloy thereof, or other suitable metal materials may be used.

The second electrode 150 is on the second substrate 120. The second electrode 150 includes a connection portion 160 and a plurality of concentric annular structures 151-153, and is on the surface of the second substrate 120 close to the first substrate 110. At least one of the plurality of concentric annular structures includes a plurality of protruded portions 1511, at least another of the plurality of concentric annular structures includes a plurality of recessed portions 1521, and the connection portion 160 is electrically connected to each of the plurality of concentric annular structures 151-153. Similarly, the second electrode 150 can be made of copper, aluminum, gold, silver or an alloy thereof, or other suitable metal materials, for example, the second electrode 150 may be formed by an etching process, and the specific forming steps are not described in detail herein.

For example, in this embodiment, the plurality of concentric annular structures 151-153 include a first annular structure 151, the first annular structure 151 includes a plurality of protruded portions 1511, and the plurality of protruded portions 1511 are protruded in a radial direction of the first annular structure 151. For example, the plurality of protruded portions 1511 are equally spaced along a circumference of the first annular structure 151. The shapes and sizes of the plurality of protruded portions 1511 are the same. For example, in one example, a number of the plurality of protruded portions 1511 is four, and the distance between the adjacent two protruded portions 1511 in the circumferential direction of the first annular structure 151 is ¼ of the circumference length (i.e., 90 degrees apart from each other). For example, the shape of each of the plurality of protruded portions 1511 (i.e., the outline of the portion protruding from the annular structure) is a rectangle. The width L1 of the rectangle in the tangential direction of the first annular structure 151 (the tangent point is the midpoint of the circular arc corresponding to the protruded portion) is less than about 4 times the width S1 of the first annular structure 151 in the radial direction, for example it can be 1.0, 2.0, 3.0 times, etc. The protruded portions 1511 are formed in a rectangular shape to improve positional accuracy and simplify the manufacturing process. Of course, the embodiments of the present disclosure are not limited thereto, the protruded portions 1511 may also be other suitable shapes, such as a semi-circular arc, a semi-elliptical arc, etc., and only needs to meet the position and size requirements.

For example, the plurality of concentric annular structures 151-153 further include a second annular structure 152, the second annular structure 152 includes a plurality of recessed portions 1521, the recessed portions 1521 are recessed in the radial direction of the second annular structure 152. For example, the plurality of recessed portions 1521 are equally spaced along a circumference of the second annular structure 152. The shapes and sizes of the plurality of recessed portions 1521 are the same. For example, in one example, a number of the plurality of recessed portions 1521 is four, and the distance between the adjacent two recessed portions 1521 in the circumferential direction of the second annular structure 152 is ¼ of the circumference length (i.e., 90 degrees apart from each other). For example, the shape of each of the recessed portions 1521 (i.e., the outline of the portion recessed into the annular structure) is a rectangle. The width L2 of the rectangle in the tangential direction of the second annular structure 152 (the tangent point is the midpoint of the circular arc corresponding to the recessed portion) is less than about 1.5 times the width S2 of the second annular structure 152 in the radial direction, for example it can be 0.5, 0.8, 1.0, 1.2 times, etc. The recessed portions 1521 are formed in a rectangular shape to improve positional accuracy and simplify the manufacturing process. Of course, the embodiments of the present disclosure are not limited thereto, the recessed portions 1521 may also be other suitable shapes, such as a semi-circular arc, a semi-elliptical are, etc., and only needs to meet the position and size requirements.

For example, the plurality of recessed portions 1521 and the plurality of protruded portions 1511 are mutually staggered in the circumference direction, and each of the plurality of recessed portions 1521 is equidistant from two adjacent ones of the plurality of protruded portions 1511. Upon both the number of the recessed portion 1521 and the number of the protruded portion 1511 being four, the angle between the line connecting one of the recessed portions 1521 and the center of the second annular structure 152 and the line connecting an adjacent protruded portion 1511 and the center of the first annular structure 151 is 45 degrees.

For example, the plurality of concentric annular structures 151-153 further include a third annular structure 153, the third annular structure 153 is located on an inner side of the first annular structure 151 and the second annular structure 152. For example, the circumference of the third annular structure 153 is less than about 1.5 times a wavelength of a target electromagnetic wave propagating in a medium layer, and is greater than about 0.2 times the wavelength of the target electromagnetic wave propagating in the medium layer, for example it can be 0.5, 0.8, 1.0, 1.2 times, etc. For example, the medium layer includes the first substrate 110, the second substrate 120 and the liquid crystal layer 130. In the embodiments of the present disclosure, the target electromagnetic wave refers to an incident electromagnetic wave upon the liquid crystal phase shifter operating. For example, upon the target electromagnetic wave propagating in the medium layer, its wavelength is a uniform value of the target electromagnetic wave under the constraints of Maxwell's equation and boundary conditions.

For example, a circumference of an outer one (such as the first annular structure 151) of the plurality of concentric annular structures 151-153 is less than about 3 times the wavelength of the target electromagnetic wave propagating in the medium layer, and is greater than the wavelength of the target electromagnetic wave propagating in the medium layer, for example it can be 1.5, 1.8, 2.0, 2.5 times, etc. The circumference of the annular structure (such as the second annular structure 152) located in the middle of the plurality of concentric annular structures 151-153 is smaller than the circumference of the outer annular structure and larger than the circumference of the third annular structure 153.

In this example, the plurality of concentric annular structures 151-153 include three annular structures. The first annular structure 151 is an outer annular structure, the second annular structure 152 is a middle annular structure. The protruded portions 1511 protrude in a direction close to the second annular structure 152, the recessed portions 1521 is recessed in a direction away from the first annular structure 151. That is, the protruded portions 1511 protrude toward the center of the first annular structure 151, the recessed portions 1521 are recessed toward the center of the second annular structure 152, and the centers of the first annular structure 151 and the second annular structure 152 coincide. It should be noted that the embodiments of the present disclosure are not limited thereto, the positions of the first annular structure 151 and the second annular structure 152 may be interchanged, i.e., in another example, the first annular structure 151 can be a middle annular structure, and the second annular structure 152 can be an outer annular structure. At this time, the protruded portions 1511 still protrude in a direction close to the second annular structure 152, and the recessed portion 1521 is still recessed in a direction away from the first annular structure 151. That is, the protruded portions 1511 protrude in a direction away from the center of the first annular structure 151, the recessed portions 1521 are recessed in a direction away from the center of the second annular structure 152.

The plurality of concentric annular structures 151-153 constitute a composite resonant structure, and the composite resonant structure is symmetric in both the x direction and the z direction. Upon the liquid crystal phase shifter operating, not only each of the annular structure resonates separately, but also electromagnetic coupling exists among the three annular structures to generate a stronger dispersion effect, and by matching the three annular structures with the liquid crystal layer 130, a large range of phase shift of incident electromagnetic waves can be realized by using the thin liquid crystal layer 130, and the response speed is fast. The composite resonant structure has a bidirectional symmetry characteristic, and can maintain the circular polarization characteristic of the incident electromagnetic wave, so that the liquid crystal phase shifter supports the circularly polarized wave. The protruded portions 1511 and the recessed portions 1521 are used to adjust and optimize the electromagnetic coupling between the three annular structures while maintaining structural symmetry to achieve the desired bandwidth and phase shift characteristics. It should be noted that, in the embodiments of the present disclosure, the spacings between the three annular structures are not limited and may be determined according to actual needs, for example, according to required bandwidth and phase shift characteristics.

For example, the connection portion 160 includes a plurality of electric leads 161-162 for maintaining electrical connection of the plurality of concentric annular structures 151-153 to facilitate application of a bias voltage to the liquid crystal layer 130 under the action of a separately provided bias voltage source. The plurality of electric leads 161-162 extend in a radial direction of the plurality of concentric annular structures and cross each other, and the plurality of electric leads 161-162 are electrically connected to each of the plurality of concentric annular structures 151-153. The plurality of electric leads 161-162 may be disposed in the same layer as the concentric annular structures 151-153, or may be disposed in different layers, such as in a printed circuit board. For example, in one example, the plurality of electric leads 161-162 include two electric leads perpendicular to each other, i.e., the first electric lead 161 and the second electric lead 162. The first electric lead 161 and the second electric lead 162 cross each other, and the cross point is located at the center of the first annular structure 151. For example, two ends of the first electric lead 161 and two ends of the second electric lead 162 are all connected to the protruded portions 1511. The electric leads 161-162 can be made of copper, aluminum, gold, silver or an alloy thereof, or other suitable metal materials may be used. For example, the width of the electric leads 161-162 is less than 10 microns to reduce interference with electromagnetic waves.

For example, a projection of the second electrode 150 on the first substrate 110 in a direction perpendicular to the first substrate 110 is within the first electrode 140. This ensures that the liquid crystal material between the first electrode 140 and the second electrode 150 is deflected by the bias voltage and that the metal layer completely reflects the incident electromagnetic wave to reduce the loss. For example, the metal layer of the first electrode 140 can completely cover the first substrate 110 or partially cover the first substrate 110, which is determined according to actual needs, and only needs to ensure that the projection of the second electrode 150 is located in the metal layer.

For example, in one example, the liquid crystal phase shifter further includes a first alignment layer 171 and a second alignment layer 172. The first alignment layer 171 and the second alignment layer 172 are respectively disposed on surfaces of the first substrate 110 and the second substrate 120 opposite to each other. The liquid crystal layer 130 is between the first alignment layer 171 and the second alignment layer 172. The first alignment layer 171 and the second alignment layer 172 are used to control a preset deflection direction of the liquid crystal molecules (for example, a deflection direction in the x-z plane). The first alignment layer 171 and the second alignment layer 172 can be formed, for example, by using an organic material such as polyimide (PI), and can be manufactured and processed by friction, illumination, or the like to obtain alignment characteristics. Of course, the embodiments of the present disclosure are not limited thereto, and other components or devices may be used to control the preset deflection direction of the liquid crystal molecules. For example, in other examples, the preset deflection direction of the liquid crystal molecules is controlled by a separately disposed alignment electrode and a bias voltage source, so that the first alignment layer 171 and the second alignment layer 172 may be omitted.

For example, in one example, the liquid crystal phase shifter further includes an encapsulation structure 180. The encapsulation structure 180 is disposed between the first substrate 110 and the second substrate 120, and surrounds the liquid crystal layer 130. The encapsulation structure 180 can be, for example, a sealant for preventing liquid crystal leakage, and functions to support the structure of the liquid crystal cell, strengthen the thickness of the liquid crystal cell, and the like. The main component of the sealant is a resin, and may further include an additive such as a heat curing monomer or the like as needed. Of course, the embodiments of the present disclosure are not limited thereto, and other suitable manners may be employed to prevent liquid crystal leakage and supporting the structure of the liquid crystal cell. For example, in other examples, the first substrate 110 is a box-like structure, and the first electrode 140, the first alignment layer 171, the liquid crystal layer 130, the second alignment layer 172 and the second electrode 150 are disposed in a bottom region of the box-like structure, the second substrate 120 is in contact with and connected to the sides of the box-like structure to encapsulate the liquid crystal layer 130 in a cavity composed of the first substrate 110 and the second substrate 120, so that the encapsulation structure 180 can be omitted.

The liquid crystal phase shifter is a reflective space feed phase shifter, and the specific working mode is as follows. The electromagnetic wave is output from, for example, a separately provided signal source, and enters the liquid crystal phase shifter from the second substrate 120 in a direction perpendicular to the first substrate 110 (parallel to the y direction) by space radiation. The phase of the electromagnetic wave is delayed in the liquid crystal layer, and the specific phase shift amount is determined by the bias voltage applied to the first electrode 140 and the second electrode 150. The electromagnetic wave is reflected by the first electrode 140, returns to the free space through the second substrate 120, is output in a space radiation manner, and is finally received by the electromagnetic wave receiver. The liquid crystal phase shifter supports a circularly polarized wave, has a large phase shift amount, a fast response speed, and has a simple structure and is easy to process with high precision.

Figure 4:
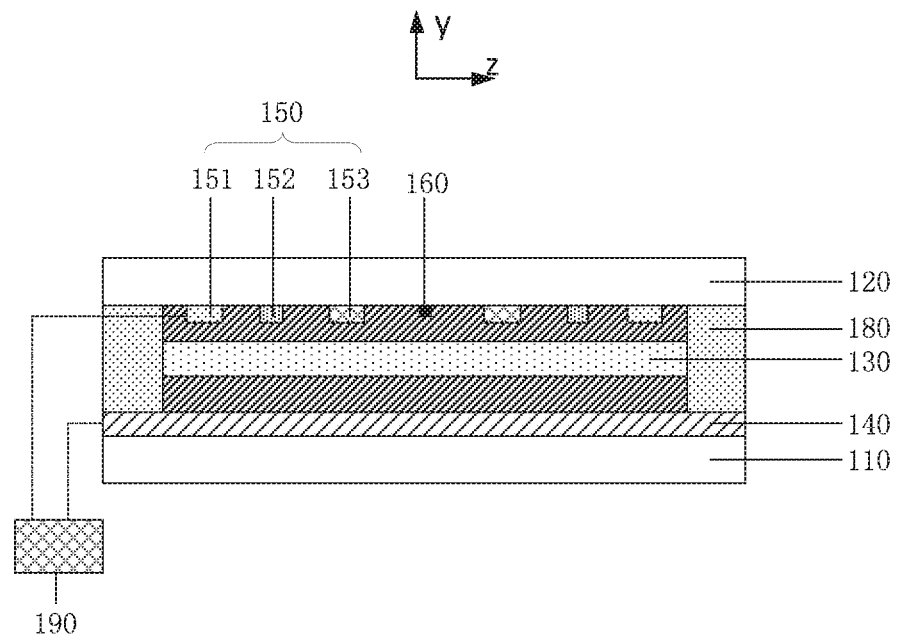
FIG. 4 is a schematic section view of another liquid crystal phase shifter according to an embodiment of the present disclosure.

FIG. 4 is a schematic section view of another liquid crystal phase shifter according to an embodiment of the present disclosure. Referring to FIG. 4, the liquid crystal phase shifter of this embodiment is substantially identical to the liquid crystal phase shifter described in FIG. 3 except that a bias voltage source 190 is further included. The bias voltage source 190 can be a direct current power source; or the bias voltage source 190 is a voltage output terminal of a control chip (not shown in the figure), and can change the output voltage or the like according to the control signal. In this embodiment, the first electrode 140 and the second electrode 150 are configured to connect the bias voltage source 190 to provide a bias electric field to the liquid crystal layer 130. For example, the direction of the bias electric field is parallel to the y direction. For example, the first electrode 140 and the second electrode 150 may be electrically connected to the bias voltage source 190 through a separately provided electric lead. By controlling the output voltage of the bias voltage source 190, the liquid crystal molecules in the liquid crystal layer 130 can be deflected, and under the combined action of the first alignment layer 171 and the second alignment layer 172, the effective phase shift constant of the electromagnetic wave propagating in the liquid crystal phase shifter can be changed, and finally the control of the phase of the output electromagnetic wave is realized. The position of the bias voltage source 190 is not limited and may be integrally connected to the liquid crystal cell structure or may be separately set, which may be determined according to the specific structure and size of the liquid crystal phase shifter.

Figure 5:
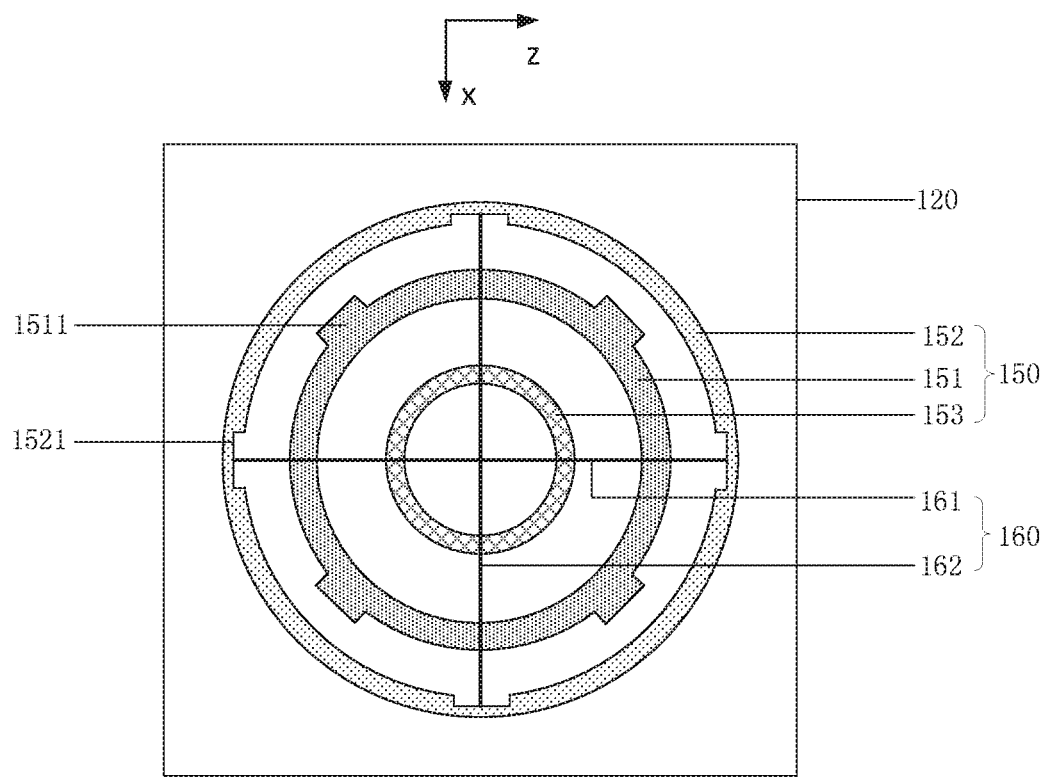
FIG. 5 is a schematic bottom view of a second substrate of another liquid crystal phase shifter according to an embodiment of the present disclosure.

FIG. 5 is a schematic bottom view of a second substrate of another liquid crystal phase shifter according to an embodiment of the present disclosure. Referring to FIG. 5, the liquid crystal phase shifter of this embodiment is substantially identical to the liquid crystal phase shifter described in FIG. 1 except for the arrangement of the first annular structure 151 and the second annular structure 152. In this embodiment, the plurality of concentric annular structures 151-153 include the first annular structure 151, the second annular structure 152 and the third annular structure 153. The second annular structure 152 is located on the outer side, and the first annular structure 151 is located between the second annular structure 152 and the third annular structure 153. The protruded portions 1511 of the first annular structure 151 protrude in the direction close to the second annular structure 152, and the recessed portions 1521 of the second annular structure 152 are recessed in the direction away from the first annular structure 151.

For example, a circumference of the second annular structure 152 is less than about 3 times the wavelength of the target electromagnetic wave propagating in the medium layer, and is greater than the wavelength of the target electromagnetic wave propagating in the medium layer, for example it can be 1.5, 1.8, 2.0, 2.5 times, etc. The circumference of the first annular structure 151 is smaller than the circumference of the second annular structure 152 and larger than the circumference of the third annular structure 153. For example, two ends of the first electric lead 161 and two ends of the second electric lead 162 are all connected to the recessed portions 1521. Compared with the liquid crystal phase shifter illustrated in FIG. 1, in the liquid crystal phase shifter of this embodiment, the arrangement positions of the first annular structure 151 and the second annular structure 152 are exchanged with each other, and in this way, the liquid crystal phase shifter can be applied to a variety of process sequences.

Figure 6:
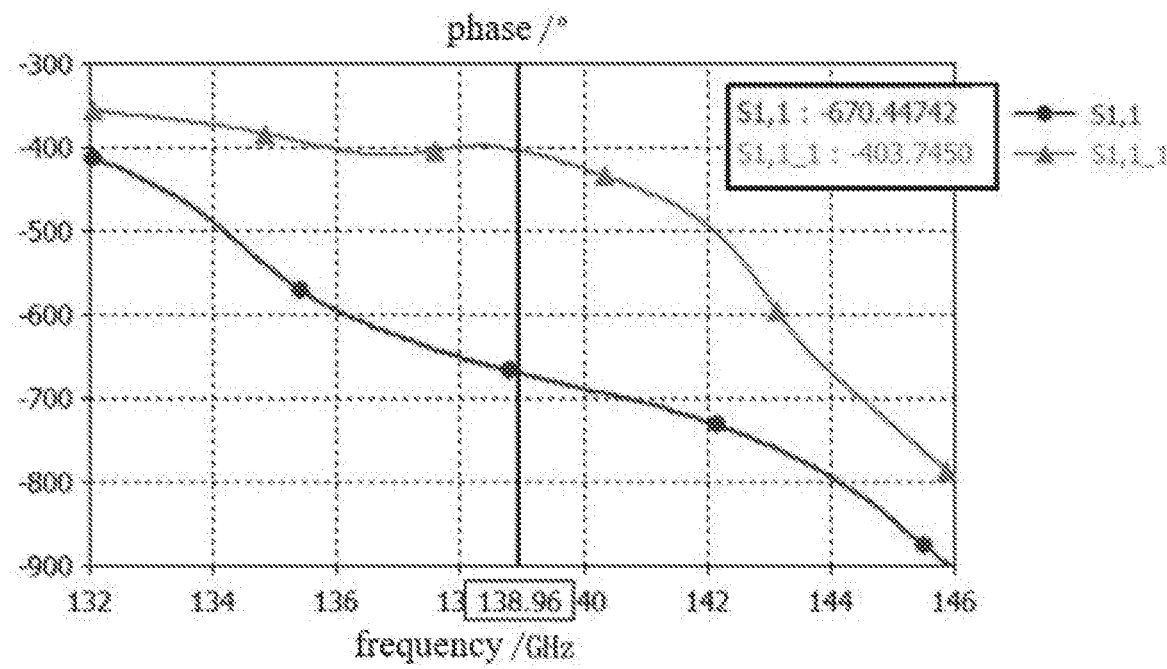
FIG. 6 is a simulation curve of a phase shift performance of the liquid crystal phase shifter illustrated in FIGS. 1-3.

FIG. 6 is a simulation curve of a phase shift performance of the liquid crystal phase shifter illustrated in FIGS. 1-3, which illustrates the frequency-phase curve of the electromagnetic wave output by the liquid crystal phase shifter in the case where the liquid crystal molecules are horizontally oriented (perpendicular to the y direction) and vertically oriented (parallel to the y direction). The curve with the triangular mark is the frequency-phase curve of the electromagnetic wave output by the liquid crystal phase shifter upon the liquid crystal molecules being horizontally oriented, and the curve with the circular mark is the frequency-phase curve of the electromagnetic wave output by the liquid crystal phase shifter when the liquid crystal molecules are vertically oriented.

The parameters of the various structures used in the simulation are provided as follows. The liquid crystal phase shifter is a specific example of the liquid crystal phase shifter described in FIGS. 1 to 3. The radius of the first annular structure 151 is 0.53 mm (inner radius, the same below), and the width S1 in the radial direction is 0.08 mm. The radius of the second annular structure 152 is 0.4 mm, and the width S2 in the radial direction is 0.05 mm. The radius of the third annular structure 153 is 0.15 mm, and the width in the radial direction is 0.08 mm. The width L1 of each of the protruded portions 1511 is 0.01 mm, and the side length perpendicular to L1 is 0.015 mm. The width L2 of each of the recessed portions 1521 is 0.01 mm, and the side length perpendicular to L2 is 0.005 mm. the liquid crystal layer 130 adopts a nematic liquid crystal having a thickness of 0.1 mm. When the liquid crystal molecules are horizontally oriented, the dielectric constants in the three directions of x, y, and z are [3.3, 2.5, 2.5] respectively, and when the liquid crystal molecules are vertically oriented, the dielectric constants in the three directions of x, y, and z are [2.5, 3.3, 2.5] respectively. The first substrate 110 and the second substrate 120 have a dielectric constant of 3.8 and a thickness of 0.3 mm.

Referring to FIG. 6, when the frequency of the electromagnetic wave is 138.96 Hz, when the liquid crystal molecules are horizontally oriented, the phase of the electromagnetic wave output by the liquid crystal phase shifter is −403.7450 degrees; and when the liquid crystal molecules are changed to vertically oriented, the phase of the electromagnetic wave output by the liquid crystal phase shifter is −670.44742 degrees. It can be seen that when the liquid crystal molecules are changed from the horizontal direction to the vertical direction, the phase of the electromagnetic wave output by the liquid crystal phase shifter changes by about 267 degrees, indicating that the phase shift amount of the liquid crystal phase shifter is large and the phase shift ability is strong. For example, the deflection angle of the liquid crystal molecules can be controlled by controlling the magnitude of the bias voltage applied to the first electrode 140 and the second electrode 150, thereby controlling the phase shift amount of the liquid crystal phase shifter. The specific correspondence between the bias voltage and the deflection angle can be obtained by theoretical calculation or actual test. It can be seen from FIG. 6 that the liquid crystal phase shifter can work stably in the frequency band of 132 GHz to 146 GHz, and thus has a wide frequency working capability. The center working frequency of the liquid crystal phase shifter is 138.96 GHz. By adjusting various parameters of the liquid crystal phase shifter, the center working frequency can be changed to meet the requirements of various working frequency bands.

It should be noted that, in the simulation model, only the dielectric constant of the liquid crystal material directly under the second electrode 150 is set to change under the bias voltage, while the dielectric constant of the liquid crystal material at other positions remains unchanged. This numerical simulation method is actually a conservative calculation of the performance of the liquid crystal phase shifter, that is, the actual test result of the liquid crystal phase shifter is better than the numerical simulation result.

At least one embodiment of the present disclosure further provides an electronic device, which includes the liquid crystal phase shifter provided by any one embodiment of the present disclosure. The electronic device supports a circularly polarized wave, has a large phase shift amount, a fast response speed, and has a simple structure and is easy to process with high precision.

Figure 7:
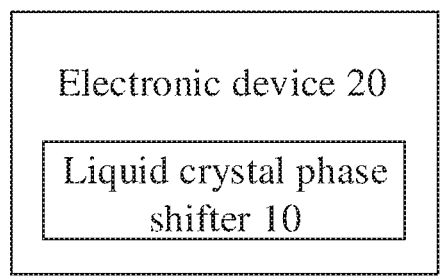
FIG. 7 is a schematic block diagram of an electronic device according to an embodiment of the present disclosure.

FIG. 7 is a schematic block diagram of an electronic device according to an embodiment of the present disclosure. Referring to FIG. 7, the electronic device 20 includes a liquid crystal phase shifter 10. The liquid crystal phase shifter 10 is the liquid crystal phase shifter provided by any one embodiment of the present disclosure. The electronic device 20 can be any device including a liquid crystal phase shifter such as an electronically controlled scanning antenna, a radar system, an accelerator, a communication base station, a power splitter, etc., which is not limited by the embodiment of the present disclosure. The electronic device 20 may also include more components, and the connection relationships between each of the components and the liquid crystal phase shifter 10 are not limited.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, the protection scope of the present disclosure should be based on the protection scope of the claims.

What is claimed is:

1. A liquid crystal phase shifter, comprising:
   a first substrate and a second substrate arranged opposite to each other;
   a liquid crystal layer, between the first substrate and the second substrate;
   a first electrode, on the first substrate;
   a second electrode, on the second substrate,
   wherein the second electrode comprises a connection portion and a plurality of concentric annular structures, at least one of the plurality of concentric annular structures comprises a plurality of protruded portions, at least another of the plurality of concentric annular structures comprises a plurality of recessed portions, and the connection portion is electrically connected to each of the plurality of concentric annular structures.

2. The liquid crystal phase shifter according to claim 1, wherein a circumference of an outer one of the plurality of concentric annular structures is less than about 3 times the wavelength of the target electromagnetic wave propagating in a medium layer, and is greater than the wavelength of the target electromagnetic wave propagating in the medium layer, the medium layer comprises the first substrate, the second substrate and the liquid crystal layer.

3. The liquid crystal phase shifter according to claim 1, wherein the first electrode is a metal layer, and a projection of the second electrode on the first substrate in a direction perpendicular to the first substrate is within the metal layer.

4. The liquid crystal phase shifter according to claim 1, wherein the liquid crystal phase shifter is a reflective space feed phase shifter.

5. An electronic device, comprising the liquid crystal phase shifter according to claim 1.

6. The liquid crystal phase shifter according to claim 1, wherein the connection portion comprises a plurality of electric leads, the plurality of electric leads extend in a radial direction of the plurality of concentric annular structures and cross each other, and the plurality of electric leads are electrically connected to each of the plurality of concentric annular structures.

7. The liquid crystal phase shifter according to claim 6, wherein both ends of each of the electric leads are connected to corresponding ones of the plurality of protruded portions.

8. The liquid crystal phase shifter according to claim 6, wherein the plurality of electric leads comprise two electric leads perpendicular to each other.

9. The liquid crystal phase shifter according to claim 1, wherein the plurality of concentric annular structures comprise a first annular structure, the first annular structure comprises a plurality of protruded portions, and the plurality of protruded portions are protruded in a radial direction of the first annular structure.

10. The liquid crystal phase shifter according to claim 9, wherein the plurality of protruded portions are equally spaced along a circumference of the first annular structure.

11. The liquid crystal phase shifter according to claim 9, wherein a shape of each of the plurality of protruded portions is a rectangle, and a width of the rectangle in a tangential direction of the first annular structure is less than about 4 times a width of the first annular structure in a radial direction.

12. The liquid crystal phase shifter according to claim 9, wherein a number of the plurality of protruded portions is four.

13. The liquid crystal phase shifter according to claim 9, wherein the plurality of concentric annular structures further comprise a second annular structure, the second annular structure comprises a plurality of recessed portions, the recessed portions are recessed in a radial direction of the second annular structure.

14. The liquid crystal phase shifter according to claim 13, wherein the plurality of recessed portions are equally spaced along a circumference of the second annular structure.

15. The liquid crystal phase shifter according to claim 13, wherein a shape of each of the plurality of recessed portions is a rectangle, and a width of the rectangle in a tangential direction of the second annular structure is less than about 1.5 times a width of the second annular structure in a radial direction.

16. The liquid crystal phase shifter according to claim 13, wherein a number of the plurality of recessed portions is four.

17. The liquid crystal phase shifter according to claim 13, wherein the plurality of recessed portions and the plurality of protruded portions are mutually staggered in a circumference direction, and each of the plurality of recessed portions is equidistant from two adjacent ones of the plurality of protruded portions.

18. The liquid crystal phase shifter according to claim 13, wherein the plurality of protruded portions are protruded in a direction close to the second annular structure, and the plurality of recessed portions are recessed in a direction away from the first annular structure.

19. The liquid crystal phase shifter according to claim 18, wherein the plurality of concentric annular structures further comprise a third annular structure, the third annular structure being located on an inner side of the first annular structure and the second annular structure.

20. The liquid crystal phase shifter according to claim 19, wherein a circumference of the third annular structure is less than about 1.5 times a wavelength of a target electromagnetic wave propagating in a medium layer, and is greater than about 0.2 times the wavelength of the target electromagnetic wave propagating in the medium layer, the medium layer comprises the first substrate, the second substrate and the liquid crystal layer.

* * * * *